United States Patent
Gutmann

(10) Patent No.: US 6,611,781 B1
(45) Date of Patent: Aug. 26, 2003

(54) METHOD AND DEVICE FOR DETERMINING A SPEED VALUE

(75) Inventor: Ralf Gutmann, Jagsthausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,035

(22) PCT Filed: Jun. 27, 2000

(86) PCT No.: PCT/DE00/02077

§ 371 (c)(1),
(2), (4) Date: Oct. 1, 2001

(87) PCT Pub. No.: WO01/10689

PCT Pub. Date: Feb. 15, 2001

(30) Foreign Application Priority Data

Aug. 6, 1999 (DE) .......................................... 199 36 710

(51) Int. Cl.⁷ ................................................ B62D 6/00
(52) U.S. Cl. ...................................................... 702/148
(58) Field of Search ........................ 702/148; 477/155; 701/36, 23; 303/113.1; 180/408; 364/426

(56) References Cited

U.S. PATENT DOCUMENTS

| | | | | |
|---|---|---|---|---|
| 4,679,808 A | * | 7/1987 | Ito et al. .................... | 180/408 |
| 5,067,778 A | * | 11/1991 | Testardi ................... | 303/113.1 |
| 5,559,701 A | * | 9/1996 | Shimizu et al. ............... | 701/36 |
| 5,655,995 A | * | 8/1997 | Kondo et al. ............... | 477/155 |
| 5,719,770 A | | 2/1998 | Matsuno | |
| 5,991,671 A | * | 11/1999 | Nishiwaki ................... | 701/23 |

FOREIGN PATENT DOCUMENTS

| | | |
|---|---|---|
| DE | 43 14 830 | 11/1994 |
| DE | 195 02 384 | 8/1995 |
| DE | 44 28 347 | 2/1996 |
| DE | 197 13 251 | 10/1998 |
| DE | 197 35 562 | 2/1999 |

OTHER PUBLICATIONS

"FDR—Die Fahrdynamikregelung von Bosch" (Bosch Vehicle Dynamic Control System), Automobiltechnische Zeitschrift 96, 1994, vol. 11, pp. 674–689**.

* cited by examiner

Primary Examiner—John Barlow
Assistant Examiner—Tung Lau
(74) Attorney, Agent, or Firm—Kenyon & Kenyon

(57) ABSTRACT

A method for determining a speed variable that represents the speed of a vehicle, including determining wheel speed variables, each of which describes the speed of a given wheel, determining weighting variables for the individual wheel speed variables, determining a support variable, via averaging, as a function of the wheel speed variables that have been weighted using the weighting variables, and determining the speed variable as a function of the support variable.

18 Claims, 7 Drawing Sheets

METHOD AND DEVICE FOR DETERMINING A SPEED VALUE

FIELD OF THE INVENTION

The present invention relates to a method and a device for determining a speed variable that represents the speed of a vehicle.

BACKGROUND INFORMATION

German Published Patent Application No. 197 13 251 concerns a method for determining a value that describes the speed of a vehicle. According to this method, the speeds for at least two wheels are determined. The value that describes the speed of the vehicle is determined as a function of the speed of just one selected wheel. The wheel used to determine the value that describes the speed of the vehicle is chosen at least as a function of an operating status of the vehicle, which is described at least via the speeds of at least two wheels and via a value which is determined as a function of at least those speeds and which represents a value that describes the vehicle's acceleration. This method may have the disadvantage that just one of the vehicle's wheels is used to support the reference speed. As a result, if the system makes a change in the wheel that is selected, there may be a change in the reference speed, although the vehicle's actual speed has not in fact changed.

German Patent No. 44 28 347 C2 apparently concerns a circuit arrangement for determining the speed of a vehicle. Apparently, the circuit arrangement has a fuzzy system into which wheel speed relative difference values relative to the speed determined at an earlier sampling instant are input as input variables. With the help of the fuzzy system, weighting factors for the individual wheel speeds are calculated. The weighted mean of the four wheel speeds is calculated and considered the speed of the vehicle; i.e., the vehicle's speed is directly considered the weighted mean, no support variable being calculated.

SUMMARY OF THE INVENTION

An object of an exemplary method and/or an exemplary device of the present invention is to provide a method and/or a device for determining a speed variable that represents a vehicle's speed which allows the speed variable to be calculated more precisely.

The exemplary method according to the present invention relates to a method for determining a speed variable that represents a vehicle's speed. To accomplish this, wheel speed values, each of which describe the speed of a given wheel, are determined. Furthermore, weighting variables for the individual wheel speed values are determined. A support variable is determined via averaging, as a function of the wheel speed values that have been weighted using the weighting variables. The speed variable is determined as a function of the support variable.

The speed variable is determined in an improved manner due to the averaging via which a support variable is determined, and due to the fact that the speed variable is determined as a function of the support variable. Due to the averaging, the speeds of a plurality of wheels are used rather than the speed of just one wheel, the speed of a given wheel being weighted as a function of the wheel's suitability for determining the speed variable. Because the speed variable is determined as a function of the support variable—this method is known as "supporting" the speed variable—further weighting can be carried out.

The following further useful advantages are associated with the exemplary method according to the present invention and the exemplary device according to the present invention:

more effective calculation of vehicle reference speed (reference calculation) in vehicle dynamics control systems such as those described in the automotive technology journal *Automobiltechnische Zeitschrift* 96, 1994, volume 11, pages 674–689, article entitled, "FDR—Die Fahrdynamikregelung von Bosch" [Bosch Vehicle Dynamics Control System];

better reference calculation based on full functionality in all driving situations in extreme all-wheel vehicles having up to 50%/50% drive distribution and limited torque coupling in their differentials;

the algorithm for reference calculation is less sensitive to erroneous input signals that can arise, for example, in the case of pulse wheels subject to tolerance on revolution sensing elements;

reference calculation is more transferable. The exemplary method according to the present invention can be used with any drive design (rear-wheel drive, front-wheel drive, all-wheel drive with center differential, all-wheel drive with Torsen differential, all-wheel drive with viscous coupling differential, etc.) without any changes being necessary. Information as to whether a wheel is driven or not is not required. The system is also suitable for use in off-road vehicles, for maintaining anti-lock brake and drive slip control systems when off road.

Moreover, a further advantage is that reference calculation can still be carried out even if the steering angle signal, the transverse acceleration signal, the yaw rate signal, or the engine torque signal are no longer present, and it can therefore be used in the back-up systems of vehicle dynamics control systems. The only input variables that are needed are the wheel speeds and the admission pressure set by the driver. The input variables that are no longer present can be calculated from the wheel speeds via modeling. This advantage arises from the fact that the algorithm for reference calculation is mainly dependent upon the wheel speeds and their derivatives and to a much lesser extent upon signals Fbij and MMot. Thus the exemplary method according to the present invention can also be used in systems in which only the wheel speeds and the wheel braking force in braking situations are available and only a rough estimate of the yaw rate is available, such as is the case in, for example, the back-up systems of vehicle dynamics control systems.

Wheel stability analysis is carried out via a fuzzy logic system, which is used instead of a crisp logic system such as that described in German Published Patent Application No. 197 13 251. Moreover, the estimated vehicle speed is corrected using a supporting wheel speed, and in addition the order of magnitude of this correction is modified on an ongoing basis.

With the help of a fuzzy approach, a supporting wheel speed is calculated from all four wheel speeds. In addition, the probability value for the suitability of the supporting wheel speed is determined and can then be used to calculate, for example, the coefficients for a Kalman-Bucy filter.

The fact that only half of the fuzzification is taken into account (the complement is not taken into account) and that scaling to a probability value is carried out simplifies the calculations considerably, and also means it is not necessary to carry out defuzzification or to subject fuzzy sets in vectorial form to logic operations. This means less processing capacity and storage capacity are required.

DETAILED DESCRIPTION

Figure 1:
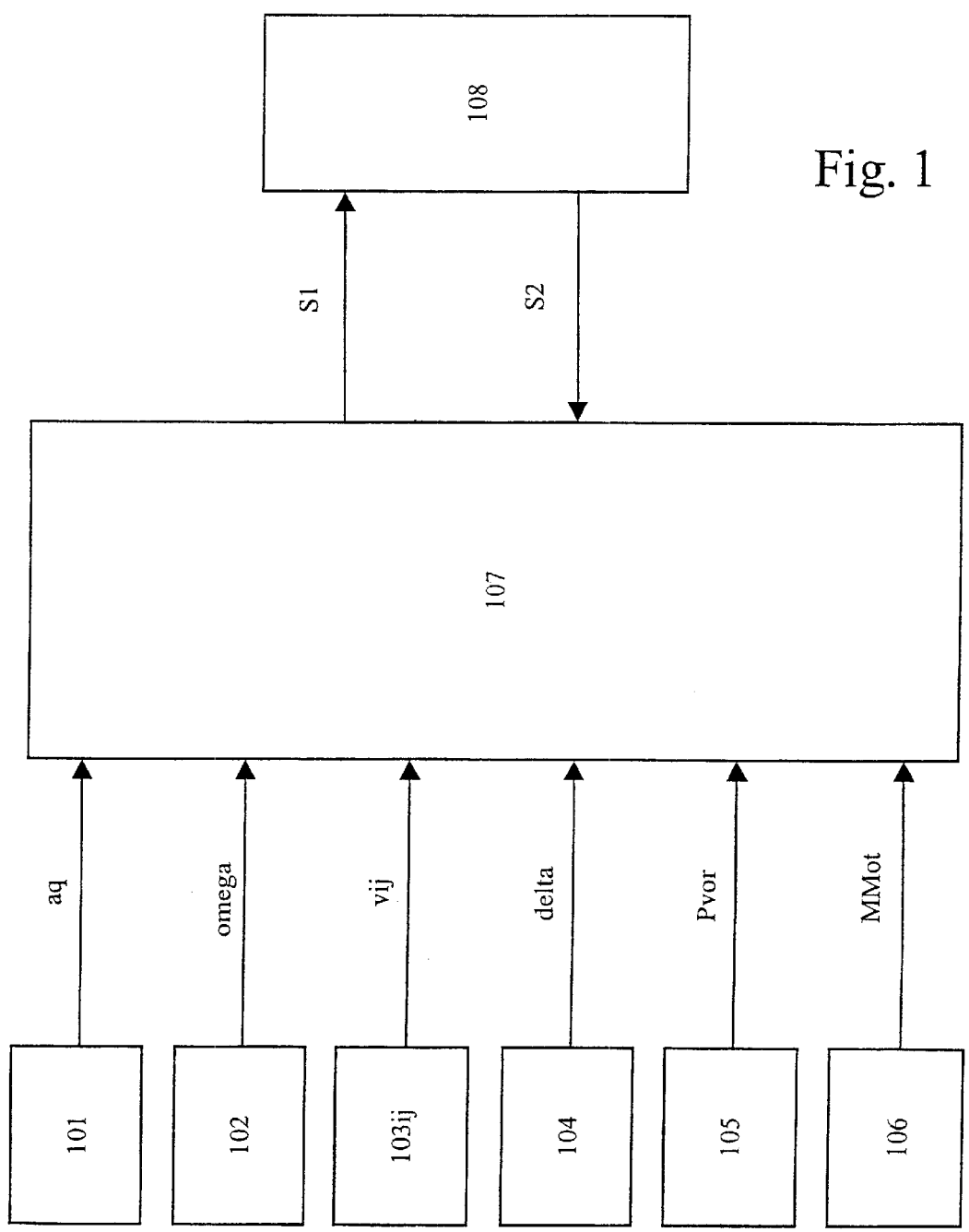
FIG. 1 shows a first block diagram of the exemplary device according to the present invention.

FIG. 1 shows controller 107. This controller is, for example, a controller used in a vehicle dynamics control system. In this regard, the aforementioned article entitled "FDR—Die Fahrdynamikregelung von Bosch" [Bosch Vehicle Dynamics Control System] is incorporated by reference, as necessary. Various input variables are sent to the controller: Transverse acceleration aq, which is determined via transverse-acceleration sensor 101; the vehicle's yaw rate omega, which is determined via yaw rate sensor 102; wheel speeds vij, which are determined via wheel revolution rate sensors 103ij; the steering angle, which is determined via steering angle sensor 104; and admission pressure Pvor set by the driver, which is determined via pressure sensor 105. Moreover, clutch torque MMot of the engine, which is made available by engine control unit 106, is sent to the controller. Starting from these input variables, the controller generates trigger signals S1 for the actuators 108 assigned to it, as a function of the design of the control principle it contains. The actuators may be, for example, means for influencing the torque generated by the engine and/or brakes applied to the vehicle's wheels, the brakes being part of a hydraulic brake system, an electro-hydraulic brake system, a pneumatic brake system, an electro-pneumatic brake system or an electro-mechanical brake system. Signals S2, which provide the controller with information about the actuators' operating status, are sent to the controller from actuators 108.

The abbreviation 103ij is used to denote the wheel revolution rate sensors. Herein, index i indicates whether a front wheel (v) or rear wheel (h) is involved. Index j indicates whether a right (r) or a left (l) vehicle wheel is involved. This abbreviation system is uniform throughout this document for all values and blocks for which it is used.

Figure 2:
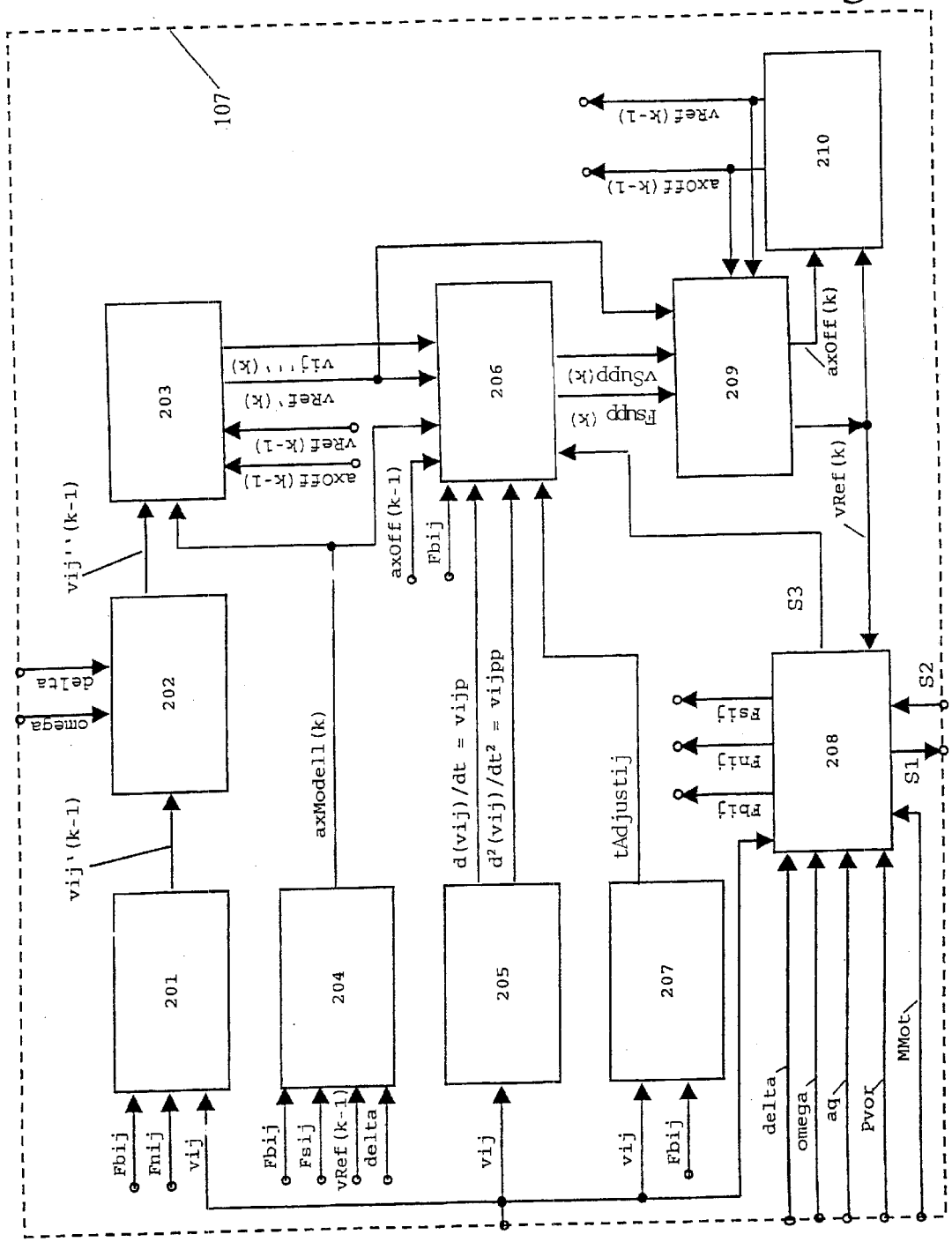
FIG. 2 shows a second block diagram of the examplary device according to the present invention.

FIG. 2 shows controller core 208 and components 201, 202, 203, 204, 205, 206, 207, 209 and 210, which are essential to the present invention.

Wheel speed values vij, steering angle delta, the vehicle's yaw rate omega, transverse acceleration aq, the admission pressure Pvor applied by the driver, the engine's clutch moment MMot, the speed variable vRef that has been determined and signals S2 are sent to controller core 208. As already mentioned, controller 107 is used to control vehicle dynamics, so as to control the vehicle's yaw rate. To accomplish this, yaw rate omega sent to controller core 208 is compared to an associated setpoint value. This setpoint value is determined with the help of a suitable vehicle model, as a function of speed variable vRef and steering angle delta. A setpoint yaw moment that is to be applied to the vehicle in order to reduce the control deviation is determined from the control deviation, which is determined from measured yaw rate omega and the associated setpoint value. This target yaw moment is converted into target slip changes for the individual wheels. Starting from these target slip changes, target slip values for the individual wheels are determined and are applied via an underlying brake slip system. To accomplish this, a given target slip value is compared to the given slip value that is present and the brake of the wheel in question is triggered as a function of the resulting deviation. As is evident from this explanation, speed variable vRef is very important. First, it is used in the calculations via which the setpoint value for the yaw rate is determined. Second, speed variable vRef is used to determine the slip values. For this reason, it is very important that speed variable vRef be determined reliably so that the vehicle's actual speed is described as accurately as possible. In addition to the underlying brake slip control system, controller core 208 also has a subordinate drive slip control system. If necessary, the drive slip control system also intervenes so as to control the vehicle. The triggering described above is carried out via signals S1.

Controller core 208 determines various values and signals that are made available to other blocks. This involves calculations regarding the wheel loads and tire loads present at the wheel or tire in question. Thus braking force Fbij between the tire and the road in the direction of wheel travel is determined in controller core 208 as a function of the admission pressure Pvor set by the driver, clutch torque MMot and the wheel speed value vij in question. To accomplish this, the angular momentum for the wheel in question is calculated. Braking force Fbij is sent from controller core 208 to blocks 201, 204, 206 and 207. The contact load, i.e., normal load Fnij of the wheel in question is calculated in controller core 208 as a function of the admission pressure Pvor set by the driver, clutch torque MMot, transverse acceleration aq, and yaw rate omega. Contact load Fnij is sent to block 201. Braking force Fsij between the given tire and the road, perpendicular to the direction of wheel travel, is determined in controller core 208 as a function of transverse acceleration aq, yaw rate omega, and steering angle delta. Braking force Fsij is sent to block 204. Furthermore, controller core 208 also handles internally generated signals and values which are combined to create signals S3 and sent to block 206. These signals and values are as follows: Value FMotr, which indicates that the engine torque information is no longer available, i.e. it indicates that value MMot is not available; value ASR, which indicates that an intervention procedure is being carried out so as to control drive slip at at least one driven wheel; value Mmot*uege, which represents the product of clutch torque MMot of the engine and total gear ratio uege from the transmission and differential, and corresponds to the drive torque generated at the driven wheels by the engine; value uege is, for example, estimated as a function of the engine rpm and the cardanic rpm; values ABSij, which indicate the wheel at which a control intervention to control brake slip is being carried out; signal FDRaus, which indicates that the driver has switched the control system over to passive mode by operating a button in the passenger compartment; and signal EnNlABS, which indicates that emergency ABS has been activated. If emergency ABS has been activated, for example the break points of the fuzzy sets are modified.

In block 201, a linear slip correction for the given wheels is carried out as a function of braking force Fbij, contact load Fnij and wheel speed values vij. Slip-adjusted wheel speeds vij'(k−1) are determined from wheel speeds vij sent to block 201. To accomplish this, first the given coefficient of friction that is present for each individual wheel is determined as a function of the given braking force Fbij and the given contact load Fnij. Based on the assumption that the wheel in question is in the linear part of the $\mu$ slip characteristic, the slip present at the wheel can be determined from the coefficient of friction that has been determined and the known tire rigidity rating, via a linear equation. Slip-adjusted wheel speed values vij'(k−1) can be determined via the equation $$vij'(k-1) = \frac{vij}{1 - lambdaij},$$

lambdaij being the slip that has been determined. Slip-adjusted wheel speeds vij'(k−1) are sent to block 202.

It is important to note that the figure in brackets next to a given value represents the time (time increment) in question. Thus vij'(k−1) represents the slip-adjusted wheel speeds at time increment (k−1).

In block 202, slip-adjusted wheel speed values vij'(k−1) are subjected to a geometric transformation to the center point of the vehicle's rear axle, as a function of yaw rate omega and steering angle delta sent to the aforementioned block. Because of the geometric transformation, the speed components contained in the wheel speed values that can be attributed to the vehicle's motion, in particular the vehicle's rotation about its vertical axis, are eliminated. This elimination is necessary to ensure that a reliable speed variable that accurately represents the vehicle's current speed can be determined. In the case of the front wheels, the transformation is carried out using the equation $$vvj''(k-1) = \frac{vvj'(k-1) - (l1 + l2) \cdot omega \cdot \sin(delta)}{\cos(delta)} \pm \frac{Spurw}{2} omega,$$

and in the case of the rear wheels the transformation is carried out using the equation $$vhj''(k-1) = vhj'(k-1) \pm \frac{Spurw}{2} omega.$$

Value l1 represents the distance between the rear axle and the vehicle's center of gravity, and value l2 represents the distance between the front axle and the vehicle's center of gravity. The value Spurw represents the vehicle's wheel track width. The plus sign is used for the wheels on the inside of the curve, and the minus sign is used for the wheels on the outside of the curve. The transformed wheel speed variables vij''(k−1) are sent to block 203 from block 202.

In block 204, value axModell(k), which describes the vehicle's acceleration, is determined based upon braking forces Fbij and Fsij sent to the aforementioned block, and based upon speed variable vRef(k−1) and steering angle delta. This value is a model acceleration that is determined using the principle of linear momentum in the vehicle's longitudinal direction, the longitudinal forces acting on the vehicle being taken into account. Wind resistance forces as well as braking forces Fbij and Fsij are taken into account as longitudinal forces. Value axModell(k) is determined via the equation:

$$axModell(k) = \frac{1}{mf}\{(Fsvl + Fsvr) \cdot \sin(delta) - (Fbvl + Fbvr) \cdot \cos(delta) -$$

$$(Fbhl + Fbhr) - cw \cdot p \cdot A \cdot vref(k-1)^2\}.$$

An estimated value is used as vehicle mass mf. The last term in the braces represents the wind force acting on a traveling vehicle. Value axModell (k) is sent from block 204 to blocks 203 and 206.

In block 203, extrapolated wheel speed variables vij'''(k) are determined from transformed wheel speed variables vij''(k−1), and extrapolated speed variable vRef'(k) is determined from speed variable vRef' (k−1). In both cases, extrapolation is carried out as a function of the vehicle's estimated acceleration. The vehicle's estimated acceleration is calculated from model-supported vehicle acceleration axModell(k) and value axOff(k−1), which describes an error offset of the model-supported vehicle acceleration. Extrapolated speed variable vRef'(k) is calculated via the equation:

$$vref'(k)=vref(k-1)+T0 \cdot axoff(k-1)+T0 \cdot axModell(k).$$

Extrapolated wheel speed variables vij'''(k) are calculated in a similar manner. In the above equation, the value T0 represents the sampling period. Value vRef'(k) is sent to blocks 206 and 209, and values vij'''(k) are sent to block 206.

In block 205, which represents signal processing, first values vijp, which describe first derivative d(vij)/dt of wheel speed variables vij and thus represent the wheel acceleration, are determined from wheel speed variables vij. Furthermore, second values vijpp, which describe second derivative $d^2(vij)/dt^2$ of wheel speeds vij and thus represent the gradients of the given wheel acceleration vijp, are determined.

The first values and the second values are determined with the help of an FIR filter, for which the general equation is:

$$y_n = \sum_{k=0}^{N} a_k \cdot x_{n-k}.$$

Coefficients ak should be selected as a function of the value vijp or vijpp to be determined. It is useful if a fourth-order FIR filter is used, an FIR filter of another order or some other suitable filter means implemented in a different way may also be used. Values vijp and vijpp are sent from block 205 to block 206.

The adjustment phases, which may have been carried out provided the brake slip control system is in active mode, and during which individual wheels are under-braked in a controlled manner, are calculated in block 207. This is based on the assumption that the wheels which have been under-braked in a controlled manner are suitable for determining the wheel speed variables. Thus in block 207, time variable tAdjustij, which describes the duration of the adjustment phase of the wheel in question assuming that wheel is being under-braked, is determined as a function of the wheel speed variables vij and the brake force Fbij sent to the aforementioned block.

Calculation of tAdjustij is started as a function of braking force Fbij. In the case of under-braking, the brake pressure and thus braking force Fbij of the wheel in question is lowered. Therefore a decrease in braking force Fbij constitutes the start instant for calculating the time variable. Calculation of the time variable ends when the system has determined, as a function of the wheel speed, that the wheel in question is behaving in stable manner. To accomplish this, it is possible, for example, to calculate the time behavior of wheel speed variable vij. Time variable tAdjustij is limited by an upper limit. The time variable is sent to block 206.

In block 206, a wheel stability analysis based on a fuzzy logic system is carried out. A detailed description of the specific method is provided below in the explanation of FIGS. 3 and 4. Values vij'''(k), vRef(k), axModell(k), axOff (k−1), Fbij, vijp, vijpp, and tAdjustij, along with various values and signals that are combined to form S3, are used as the input variables for the wheel stability analysis. With the help of the fuzzy logic system implemented in block 206, support variable vSupp(k) and evaluation variable Fsupp(k) are determined and are sent to block 209.

In block 209, speed variable vRef(k) is corrected as a function of the values vSupp(k) and Fsupp(k) sent to the aforementioned block, via the equation:

$$vref(k)=vref'(k)+kovx\cdot(vSupp(k)-vref(k-1)).$$

Value kovx is determined in a suitable manner from evaluation variable Fsupp(k). The method shown in the equation is known as "supporting" speed variable vref via support variable vSupp. Speed variable vRef(k) determined in block 209 is sent to blocks 208 and 210.

In block 209, value axOff(k) is determined in a similar manner, via the equation:

$$axoff(k)\cdot T0=T0axoff(k-1)+koaxoff\cdot(vSupp(k)-vref(k-1)).$$

This method also constitutes "supporting". Factor koaxOff is also determined from evaluation variable Fsupp in a suitable manner. Value axOff(k) is sent to block 210.

Block 210 is a storage means that is known heretofore, via which the values axOff and vref of an earlier time increment are made available, i.e. if, in block 209, speed variable vref for time increment k is determined, block 210 supplies the speed variable vRef and the value axOff of the previous time increment k−1. The value axOff(k−1) supplied by block 210 is sent to blocks 203, 206, and 209, and value vRef(k−1) supplied by block 210 is sent to blocks 203, 204 and 209.

Calculation of speed variable vRef in blocks 203 (extrapolation) and 209 (correction or supporting), and calculation of value axOff (correction or support) in block 209, are based on a stationary, time-discrete Kalman-Bucy filter. A filter of this kind may be described by the equation:

$$\hat{x}(k)=F\cdot\hat{x}(k-1)+\hat{y}(k)+K\{z(k)-H(F\cdot\hat{x}(k-1)+\hat{y}(k)\}.$$

In this equation, $\hat{x}(k)$ represents the desired state at time increment k; Ff represents the system's dynamics matrix; y(k) represents the input variable; K represents a weighting matrix; z(k) represents the value used for supporting; and H represents an output matrix.

Calculation of the speed variables is based on a second-order system. This system includes a model for speed variable vRef and a model for error term T0*axOff, which can compensate for unknown errors in acceleration value axModell and the modeling. Per this modeling, the desired state is x=[vref, axoff·T0] and y=[axModell·T0.0]. It is important to note that speed variable vRef represents the vehicle's longitudinal speed at the center point of the rear axle. In the model, speed variable vRef is the integral of the vehicle acceleration. This model can be described via the following equation:

$$vref(k)=vref(k-1)+T0\cdot axoff(k-1)+T0\cdot axModell(k).$$

A zero dynamic per the equation $$axoff(k)\cdot T0=axoff(k-1)\cdot T0$$

is chosen as the model for the error term T0*axoff. Starting from the models and definitions described above, the following estimate equations are used for speed variable vRef and error term T0*axOff:

$$vref(k)=vref(k-1)+T0\cdot axoff(k-1)+T0\cdot axModell(k)+kovx\cdot(vSupp(k)-vref(k-1))axoff(k)\cdot T0=T0\cdot axoff(k-1)+koaxoff\cdot(vSupp(k)-vref(k-1)).$$

These estimate equations can be derived from the equations described in connection with blocks 203 and 209.

Values kovx and koaxOff contained in the estimate equations are determined from evaluation variable Fsupp via a calculation method for a Kalman-Bucy filter, which is an available filter. As can be seen from these two estimate equations, the given correction or supporting is influenced by factors kovx and koaxOff. To sum up: The magnitude of the correction or supporting is influenced via evaluation variable Fsupp.

The magnitude of the correction or supporting of speed variable vref is determined with the help of variable Fsupp. A quantity for the system noise and measuring noise is determined from Fsupp with the help of a functional relationship. Matrix K, which changes over time and which adaptively brings the stationary filter in line with the uncertainty of "measured variable" vsupp, is obtained from this. The functional relationship of the noise values of Fsupp and, from that, via the Kalman model, coefficients kovRef and axOff of the Kalman matrix for observing vRef and axOff, can be implemented for a given stationary Kalman filter via two characteristic curves having as many points as desired.

Figure 3:
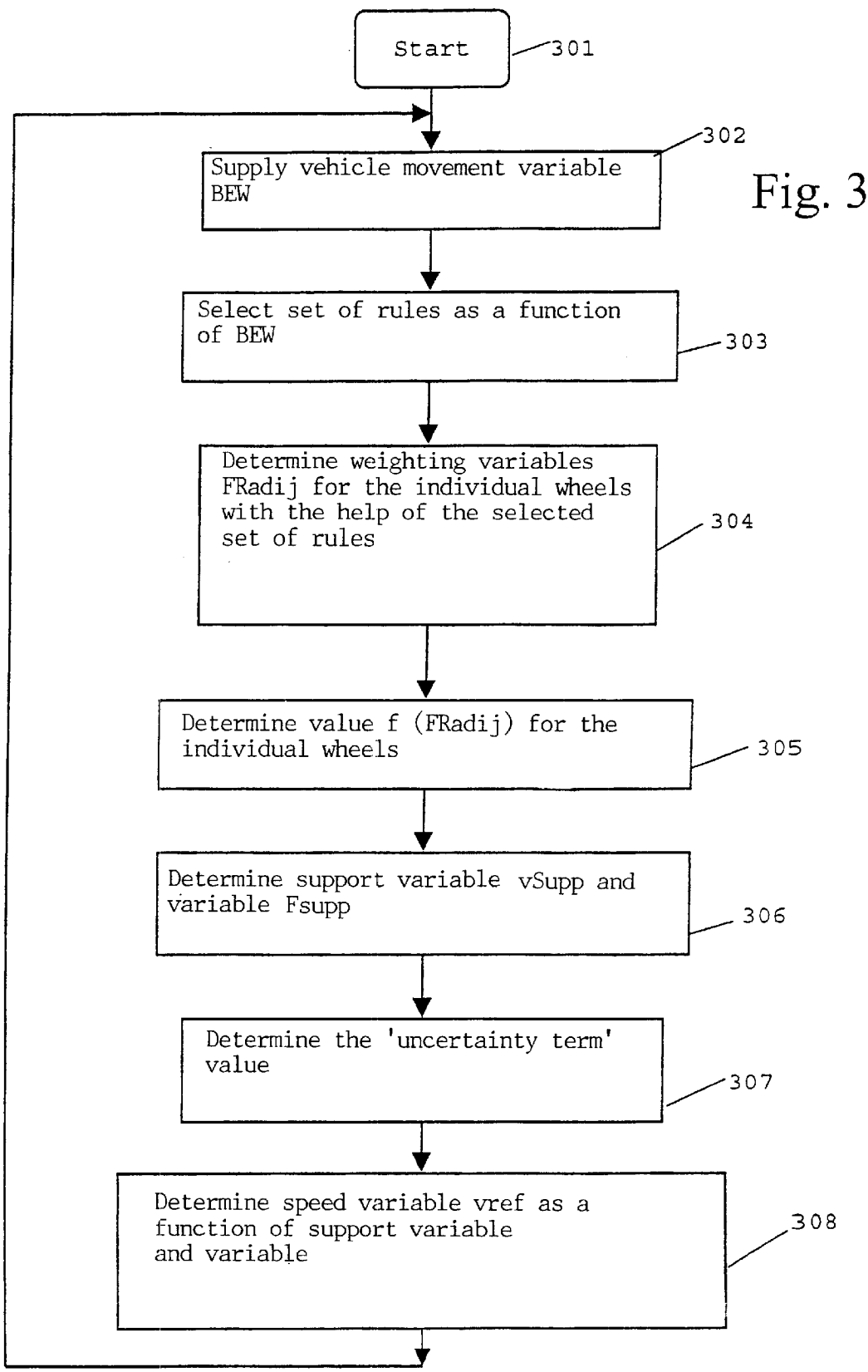
FIG. 3 shows a first aspect of the exemplary method according to the present invention used in the exemplary device according to the present invention.

Below, we describe FIG. 3, which shows, with the help of a flow chart, the wheel stability analysis, which is based on a fuzzy logic system and is carried out in block 206. The wheel stability analysis starts with step 301, after which processing moves to step 302. In step 302, vehicle movement variable BEW, which characterizes at least the vehicle's movement in the longitudinal direction, is supplied. We explain in detail below how vehicle movement variable BEW is supplied, in the description of FIG. 4. It is important to note that the vehicle movement variable is determined at least based upon wheel speed variables vij and/or time derivatives vijp of the wheel speed variables, and/or based upon axModell, which describes the vehicle's longitudinal acceleration, and/or value ASR, which indicates that a drive slip control intervention has been carried out. After step 302, processing moves to step 303.

As already mentioned, wheel stability analysis is carried out with the help of a fuzzy logic system. A fuzzy logic system may be set up in the following way: Membership functions known as fuzzy sets are defined and set up for a linguistic variable, e.g. the wheel speed or the wheel acceleration. Using the membership functions, the input values sent to the fuzzy logic system, which constitute crisp values, are fuzzified, i.e. the input values are plotted on a linguistic value scale. Fuzzification may be followed by fuzzy reasoning, i.e. a series of statements which, for specific input value combinations, define the accompanying output value combinations in the form of IF . . . THEN rules, are made using linguistic variables, so as to describe the system's behavior. After this, defuzzification may be carried out, i.e. a crisp setting value is generated from the fuzzy output values via the individual manipulated variables. To accomplish this, usually the area beneath the curves is taken into consideration in conjunction with the membership functions.

However, the approach used in the exemplary method according to the present invention differs from other fuzzy logic approaches in the following way: As the desired output variable for the given wheel, which is to be determined via the wheel stability analysis, is a probablity value (weighting variable Fradij) rather than an actuating signal via which, for example, a controller could be triggered and whose value would have to correspond to a defined response, it is sufficient to analyze and calculate only the relevant half of the fuzzy set. The complement of the fuzzy set does not have to be taken into account. This approach has the following major advantage: As the linguistic variables that have been obtained are already probability values with the corresponding scaling, there is no need for subsequent defuzzification, which usually involves the greatest expense. Thus only scalar signals have to be subjected to logic operations. To subject the linguistic variables to logic operations, for example, the following available operators of fuzzy logic systems, are used:

$$FuzzyAND: y = Gamma * MIN(x1, x2) + (1 - Gamma) * \frac{x1 + x2}{2}$$

$$FuzzyOR: y = Gamma * MAX(x1, x2) + (1 - Gamma) * \frac{x1 + x2}{2}$$

with Gamma $\epsilon$ [0, 1]

Herein, values x1 and x2 are input variables; value y is the output variable. For the individual logic operations, a fixed, predefined value is assigned to value Gamma.

Figure 5A:
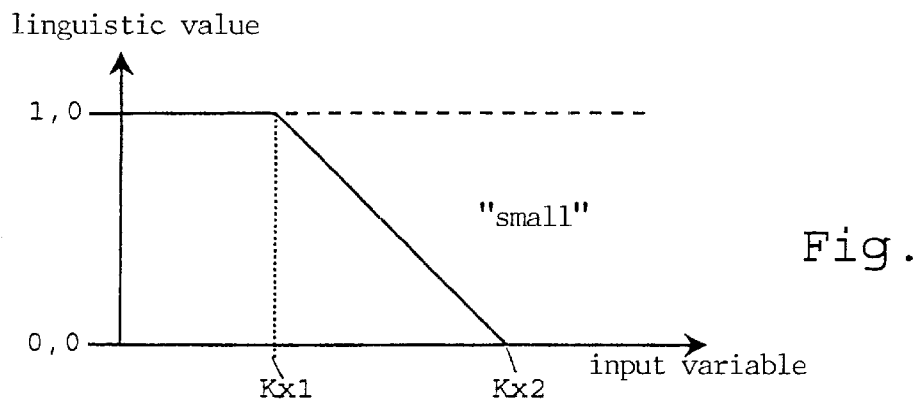
FIG. 5a shows a membership function of the fuzzy control system on which the exemplary method according to the present invention is based.
Figure 5B:
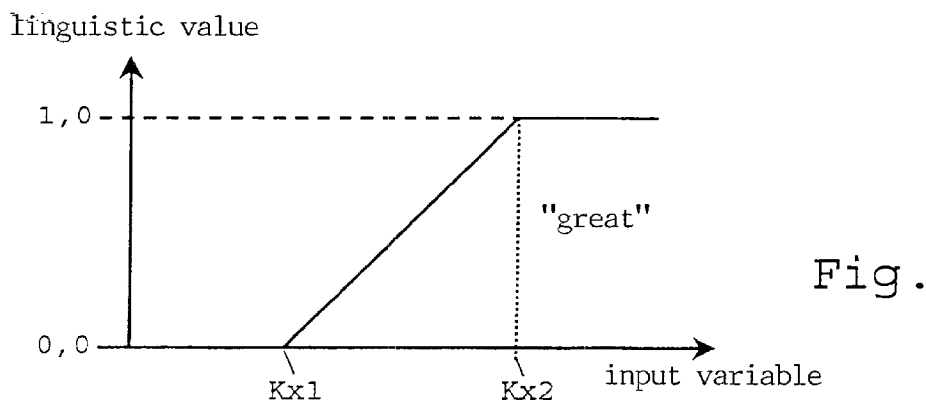
FIG. 5b shows another membership function of the fuzzy control system on which the exemplary method according to the present invention is based.
Figure 5C:
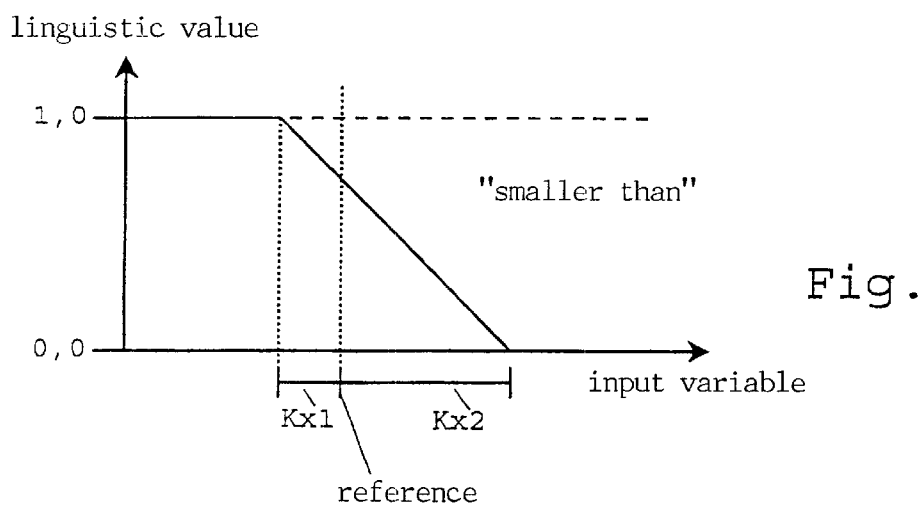
FIG. 5c shows another membership function of the fuzzy control system on which the exemplary method according to the present invention is based.
Figure 5D:
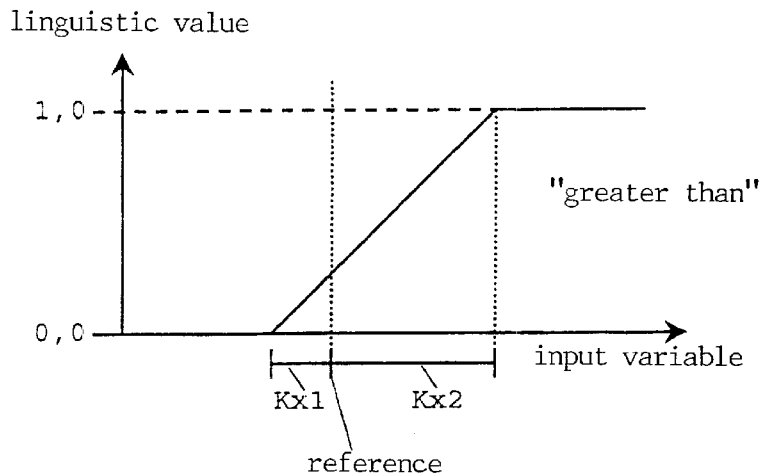
FIG. 5d shows another membership function of the fuzzy control system on which the exemplary method according to the present invention is based.
Figure 5E:
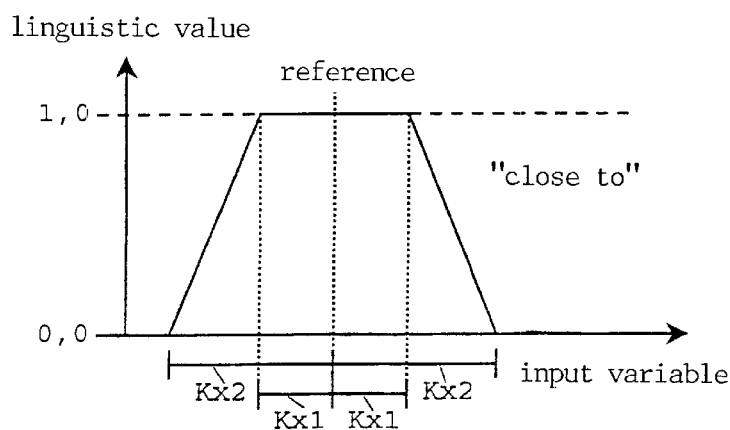
FIG. 5e shows another membership function of the fuzzy control system on which the exemplary method according to the present invention is based.
Figure 5F:
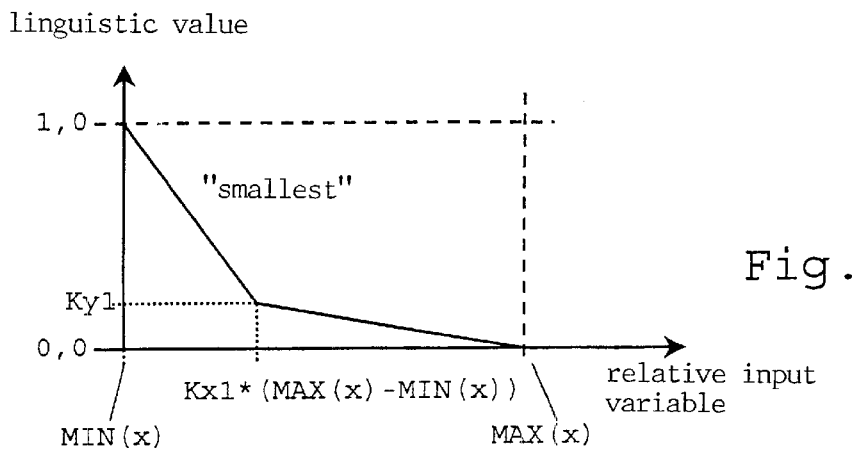
FIG. 5f shows another membership function of the fuzzy control system on which the exemplary method according to the present invention is based.
Figure 5G:
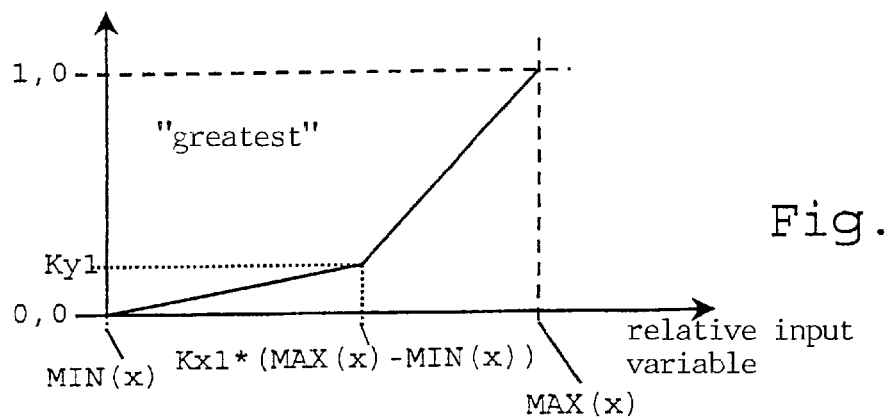
FIG. 5g shows another membership function of the fuzzy control system on which the exemplary method according to the present invention is based.
Figure 5H:
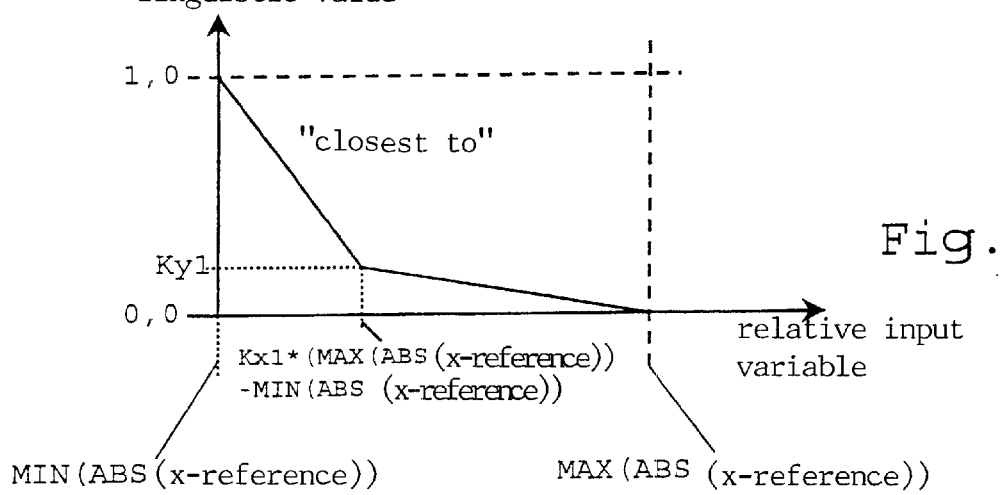
FIG. 5h shows another membership function of the fuzzy control system on which the exemplary method according to the present invention is based.

The following fuzzy sets are used to calculate the linguistic variables: "small" (FIG. 5a); "smallest" (FIG. 5f); "great" (FIG. 5b); "greatest" (FIG. 5g); "smaller than" (FIG. 5c); "greater than" (FIG. 5d); "close to" (FIG. 5e); and "closest to" (FIG. 5h). We explain the individual fuzzy sets in greater detail below, in our explanation of FIGS. 5a to 5h.

In step 303, a set of rules is selected as a function of vehicle movement variable BEW. Thus weighting variables Fradij, which indicate how suitable a given wheel speed variable vij is for correcting or supporting speed variable vRef, are calculated, the driving situation, which is described by vehicle movement BEW, being taken into account or considered.

If vehicle movement variable BEW indicates that the 'acceleration' driving situation is present, the following set of rules is selected:

```
FRadij =        (FRadij from straightforward stability analysis (FRStij))
        or      (FRadij from situation analysis (FRSiij))
        or      (FRadij from time-related uncertainty term FRZij))
FRStij =        (absolute value of vijpp small)
        and     (   (absolute value of vijpp smallest)
                or  (difference between vijppmin and
                     vijppmax small))
        and     (absolute value of vijp small)
        and     (   (vij close to axModell + axOff
                     (not in the case of FMotr))
                or  (absolute value of axOff great
                     (not in the case of FMotr)))
        and     (   ( vij ''' close to vRef)
                and (    (vij ''' closest to vRef)
                    or   (difference between vijmin
                         and vijmax small)))
            or  (   (vij ''' smaller than vRef
                     (vij ''' > 2*vijMin))
                and  (Fbij small          (vij ''' > 2*vijMin))))
FRSiij =        (vij ''' close to vRef
        and     (vij ''' smaller than vRef)
        and     (number of wheels having (vij ''' smaller than
                 vRef) great)
FRZij =         (uncertainty term great)
        and     (   (   (vij ''' smaller than vRef)
                    and (Fbij small))
                or  (   (vij ''' close to vRef)
                    and (absolute value of vijp small))).
```

If vehicle movement variable BEW indicates that the 'deceleration' driving situation is present, the following set of rules is selected:

```
FRadij =        (    (FRadij from straightforward stability analysis (FRStij))
            and     (FRadij from situation analysis (FRSiij)))
        or  (Fradij from under-braking analysis (FRUbFij))
        or  (FRadij from time-related uncertainty term (FRZij))
FRStij =        (absolute value of vijpp small)
        and     (   (absolute value of vijpp smallest)
                or  (difference between vijppmin and vijppmax small))
        and     (absolute value of vijp small)
        and     (vijp close to axModell + axOff   (not in the case of [FMotr and (ABS]))
        and     (   (vij ''' greatest)
                or  (difference between vijmin and vijmax small))
FRSiij =        (   (vij ''' smaller vRef)
        and     (vijp small)
        and     (    (vij ''' greatest)
                or   (difference between vijmin and vijmax small))
        and     (absolute value of vijpp small     (vij ''' > 2*vjMin)))
        and     (number of wheels having [absolute value of vijpp very small] great)
                                           (vij ''' > 2*vjMin)))
        or  (    (vij ''' greater than vRef)
            and  (Fbij great)
            and  (vijp great)
```

-continued

```
                and     (       (vij ''' close to vRef')
                        or      (difference between vijmin and vijmax small)))
        or      (tAdjustij) great       (wheel in adjustment phase)
                and     (vijp small)
                and     (       (vij ''' greatest)
                        or      (difference between vijmin and vijmax small)))
        or      (       (vij ''' close to vRef')
                and     (vijp great)
                and     (number of ABS-controlled wheels small))
FRUbFij =               (absolute value of vijp small)
        and     (difference between vijmin and vijmax small)
        and     (difference between vijpmin and vijpmax small)
        and     (difference between vijppmin and vijppmax small)
        and     (vij ''' smaller than vRef'       (vij ''' > 2*vijMin))
FRZij =         (uncertainty term great)
        and     (vij ''' smaller than vRef40 )
        and     (vij ''' greatest)
        or      (difference between vijmax and vijmin small)
```

If vehicle movement variable BEW indicates that some other driving situation is present, the following set of rules is selected:

```
Fradij =        (FRadij from straightforward stability analysis
                (FRStij))
        or      (FRadij from situation analysis (FRSiij,
                onlyinthecaseofFMotr))
        or      (FRadij from time-related uncertainty term FRZij))
FRStij =        (absolute value of vijpp small)
        and     (       (absolute value of vijpp smallest)
                or      (difference between vijppmin and vijppmax
                        small))
        and     (absolute value of vijp small)
        and     (vijp close to axModell + axOff
                        (not in the case of FMotr))
        and     (       (       vij ''' close to vRef')
                        and     (       (vij ''' closest to vRef')
                                or      (difference between vijmin
                                        and vijmax small)))
                or      (       (vij ''' smaller than vRef')
                        and     (difference between vijmin and
                                vijmax small)))
FRSiij =        (vij ''' close to vRef')
        and     (vij ''' smaller than vRef')
        and     (number of wheels having (vij ''' smaller
                than vRef) great)
FRZij =         Zero
```

After step 303, step 304, in which weighting variables Fradij are determined for the individual wheels with the help of the selected set of rules, is carried out.

Below, the exemplary method for determining weighting variables Fradij is explained by describing, by way of example, the set of rules used for the 'acceleration' driving situation. Value Fradij determined using this this set of rules includes a plurality of individual weighting variables and individual probability values, i.e. weighting variable Fradij is obtained by subjecting a plurality of individual weighting variables to logic operations. In the present case, weighting variable Fradij includes the following individual weighting variables: Stability variable FRStij, which is a measure of the stability of the wheel in question and describes the straightforward stability of the wheel in question, value FRStij being primarily determined as a function of wheel variable vijpp; situation variable FRSiij, which describes the wheels' current situation—this situation variable contains at least the status of the given wheel speed variable vij relative to speed variable vRef and/or a value indicating how many of the wheels fulfill a predefined condition, this latter value representing the number of wheels whose wheel speed variable vij is smaller than speed variable vRef; quality variable FRZij, which is a measure of the quality of weighting variables Fradij determined in the previous time increments. Quality variable FRZij is an integral uncertainty term indicating the probable degree of error associated with speed variable vRef. The meaning of value FRZij can be described as follows: If weighting variable Fsupp is small for a fairly long time, speed variable vRef is primarily determined via extrapolation. As the information regarding individual wheels that would be included in speed variable vRef via supporting is only taken into account to a very limited degree, speed variable vRef may be determined erroneously. To be able to spot this shortcoming and counteract it, value FRZij is determined. The weighting variable is predominantly a function of the stability variable. To determine the stability variable, primarily the rule (absolute value of vijpp small) is used. The smaller the value vijpp, the greater the resulting value for this rule and the greater the extent to which this wheel is used to support the speed variable. However, wheels that behave in this way may also arise due to control interventions. As these wheels should not be considered stationary and are thus less suitable for supporting speed variable vRef, the other two individual weighting variables via which such wheels can be recognized are used.

In connection with the 'deceleration' driving situation, individual weighting variable FRUBFij, which describes the modification phase or under-braking present for the wheel in question, is also determined and calculated.

Some of the rules include, in braces, expressions that are partially negated and partially non-negated. An example of a rule having a negated expression is [vijp close to axModell+axoff {not in the case of FMotr}]. Value FMotr in the braces indicates whether the engine torque information is still available. Rule (vijp close to axModell+axoff) is only used if the engine torque information is still available. Other negated expressions are interpreted in a similar manner. One example of a non-negated instance is [vij'" smaller than vRef'{vij'">2*vijMin}]. The rule (vij'" smaller than vRef') is only used if the condition {vij'">2*vijMin} is fulfilled or satisfied.

The value of weighting variable Fradij is defined as follows: First, the given values for stability variable FRStij, situation variable FRSiij, and quality variable FRZij are determined. Here, we explain the method used with reference to quality variable FRZij. Quality variable FRZij includes the following rules:

(Uncertainty term great) (E1)

($vij'''$ smaller than $vRef'$) (E2)

($Fbij$ small) (E3)

($vij'''$ close to $vRef'$) (E4)

and (absolute value of $vijp$ small) (E5).

First, rules (E1) to (E5) are used. This is carried out with the help of the membership functions shown in FIG. 5. Herein, the rules and thus the individual weighting variables and weighting variable may have any value between 0 and 1.

Below, we describe, by way of example, the use of rule (E3), to which the membership function shown in FIG. 5a relates. Braking force Fbij is the input variable. To determine the result of this rule, the value of braking force Fbij is plotted on the abscissa. The result of the rule is the point where the vertical line that passes through the abscissa point intersects with the membership function. The results of the other rules are determined in a similar manner. The individual results are subjected to logic operations in conjunction with quality variable FRZij in a similar manner using the aforementioned fuzzy operators. Stability variable FRStij and situation variable FRSiij are determined in a similar manner. The three values FRStij, FRSiij and FRZij are each subjected to logic operations in conjunction with weighting variable Fradij, using the fuzzy operator "or".

To sum up: First, the results for the rules are obtained with the help of the membership functions. Using these results, the individual weighting variables are determined with the help of fuzzy operators, and then the weighting variable is determined from those values, also with the help of the fuzzy operators.

The aforementioned explanation also applies in a similar manner to the sets of rules that are used for the 'deceleration' driving situation and "other driving situations."

Below, we provide an explanation of various rules:

before using the rule [difference between vijppmin and vijppmax small], first the values vijppmin and vijppmax must be determined, and then the difference between them must be calculated.

the rule [number of wheels having [$vij'''$ smaller than vRef'] great] is used as follows: First, the result of the rule [$vij'''$ smaller than vRef'] is determined for all wheels. The results are then added up. The resulting total is used, with the help of the membership function shown in FIG. 5b.

when rule [number of ABS-controlled wheels small] is used, first the system uses the signals or values ABSij contained in S3 to determine how many wheels are being subjected to ABS control. Then the resulting value is used, using the membership function shown in FIG. 5a.

The minimum values and maximum values used in the rules, e.g. vijppmin and vijppmax, may be determined using suitably appropriate and available storage means and comparison means. The input variables that are used for the wheel stability analysis are as follows: axOff, $vij'''$, vijp, vijpp, Fbij, and tAdjustij. In the tables showing the various sets of rules, in the case of each individual value we have not shown the time increment in question; this is for the sake of clarity.

Figure 6:
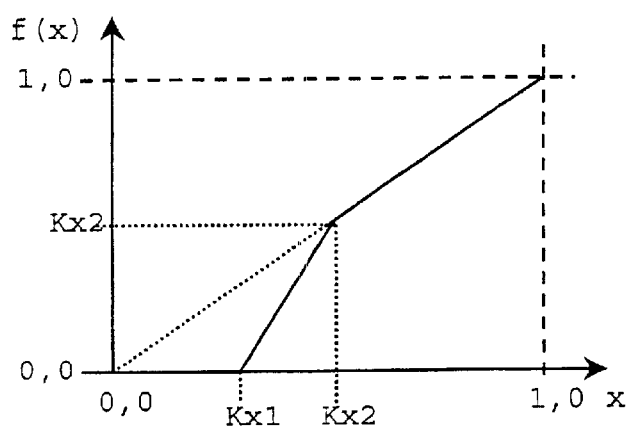
FIG. 6 shows a function used to filter values as part of the fuzzy control system.

After step 304, step 305, in which values f(Fradij) are determined, is carried out. This calculation is carried out with the help of the function shown in FIG. 6, value x being the input signal for which calculations are performed with the help of the curve of function f(x). The curve of function f(x) has various different sections: Between abscissa value 0 and Kx1, function f(x) has the value 0; between abscissa values Kx1 and Kx2, function f(x) has gradient Kx2/(Kx2−Kx1); and between abscissa values Kx2 and 1, function f(x) has the gradient of the bisector that passes through the origin. This means that small values of the input variable are filtered out (values between 0 and Kx1) or suppressed (values between Kx1 and Kx2).

After step 305, step 306, in which support variable vSupp and evaluation variable Fsupp are determined, is carried out. The support variable is determined as a function of the values f (Fradij), i.e. from the weighting variables Fradij determined via function f (x) and from slip-corrected and transformed wheel speed variables $vij'''$. This is carried out, for example, per the function:

$$vSupp = \frac{\sum (vij''' * (f(FRadij))^2)}{\sum (f(FRadij))^2},$$

summation being carried out over all wheels.

Evaluation variable Fsupp is determined as a function of value f (Fradij), for example per the relationship:

$$Fsupp = a * MAX(f(FRadij)) + (1-a) * MIN(\Sigma(f(FRadij)), 1),$$

with a ∈ [0, 1].

Evaluation variable Fsupp represents the probability that value vSupp is suitable for supporting speed variable vref. Value Fsupp is primarily dependent on the maximum Fradij value, i.e. on the weighting variable of the wheel which is most suitable for determining value vSupp and which thus makes the greatest contribution to value vSupp. Summation and calculation of the maximum are carried out over all wheels.

After step 306, step 307, in which the 'uncertainty term' value is determined, is carried out. The 'uncertainty term' value is determined as a function of the weighting variable, for example per the relationship uncertainty term=MAX (0, uncertainty term (k−1)−KAb*(Fsupp−P_FrefP) for Fsupp≧P_FrefP−KAn*(Fsupp−P_FrefP) for Fsupp<P_FrefP)

with P_FrefP ∈ [0, 1].

The 'uncertainty term' value is used to estimate the possible degree of error associated with speed variable vref. The 'uncertainty term' value is an integral measure of the fact that for a fairly long period of time small values of Fsupp have not resulted in any correction of the speed variable. In the above equation, KAn and KAb are magnification factors to be applied, where KAn<<KAb.

After step 307, in step 308 speed variable vref is determined as a function of support variable vSupp and evaluation variable Fsupp. This calculation is carried out using the equations set forth earlier in this document. The values axModell and axoff as well as the two values vSupp and Fsupp are used to calculate speed variable vref.

After step 308, step 302 is carried out again, i.e. starting from the current time increment speed variable vref for the subsequent time increment is calculated.

Figure 4:
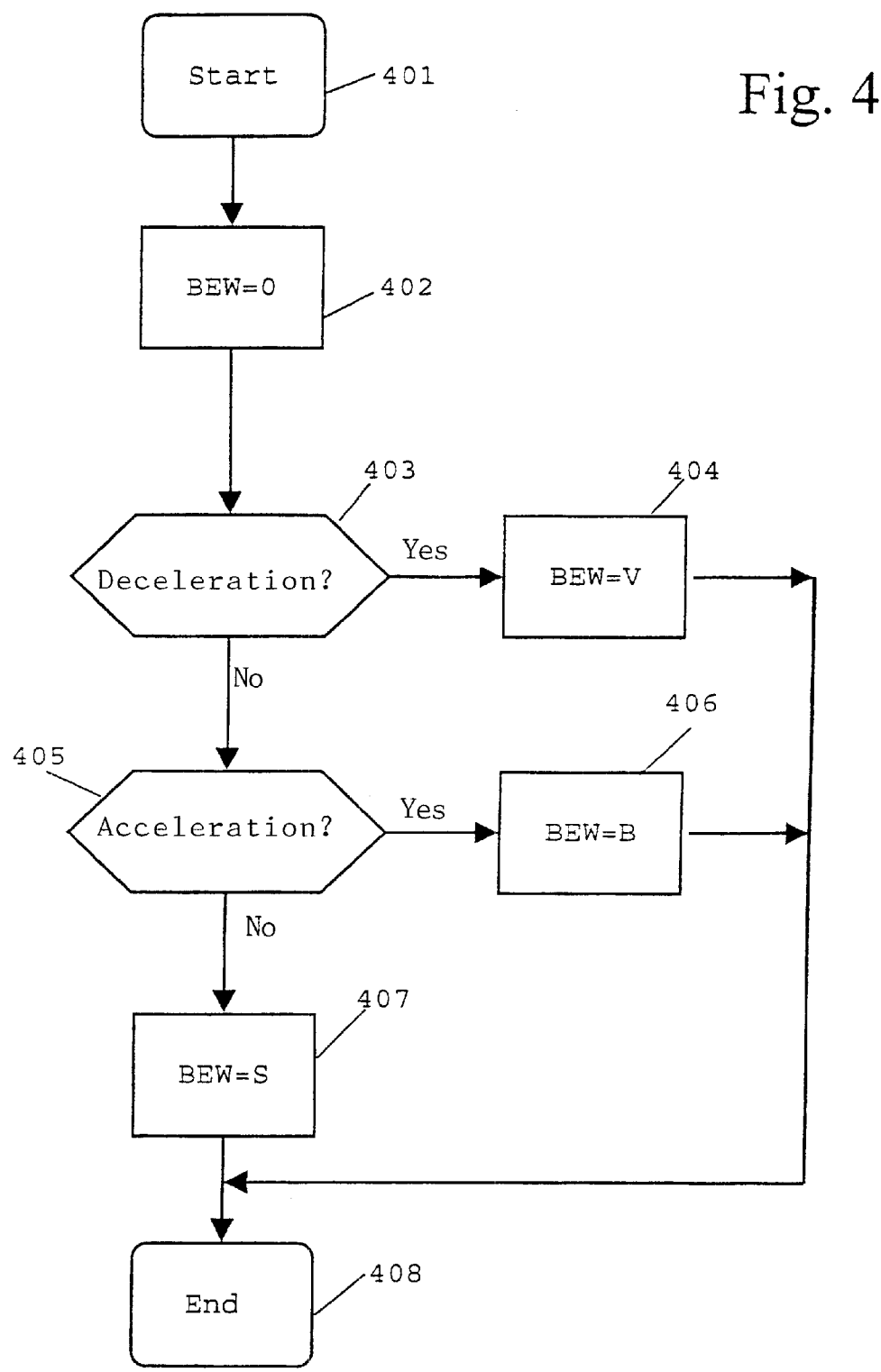
FIG. 4 shows a second aspect of the exemplary method according to the present invention used in the exemplary device according to the present invention.

Below, we explain FIG. 4. This figure shows how vehicle movement variable BEW is supplied, as carried out in step 302. The procedure for supplying and calculating vehicle movement variable BEW starts in step 401, which is followed by step 402, in which value BEW is initialized, i.e. the value 0 is assigned to it. After step 402, step 403, in which, with the help of the queries

```
deceleration =   (not ASR)
           and  (  (     (mean vij ''' < vRef)
                   and  (mean vijp < p_aRadmVerz)
                  or  (axModell < P_axVerz)
                  or  (number of wheels in ABS > 2)
``` the system determines whether the 'deceleration' driving situation is present for the vehicle. If, in step 403, the system determines that the 'deceleration' driving situation is present, after step 403 step 404 is carried out. In this step, the value V is assigned to value BEW. After step 404, step 408, in which the procedure for supplying value BEW is ended, is carried out. However, if in step 403, the system determines that the 'deceleration' driving situation is not present, after step 403 step 405, in which the system determines whether the driving situation 'acceleration' is present for the vehicle by using the queries

```
acceleration =   (not deceleration)
           and  (  (     (mean vij ''' > vRef)
                   and  (mean vijp > P_aRadmAccel))
                  or  (    (MMot*ueGe >
                            P_MkaHalfAccel)
                       or  (   ASR
                           and   (axModell > P_axAccel)))
                  and  (axModell + axOff > P_axAccel))
                  or  (    FdrAus
                       and  (MMot*ueGe >
                            P_MkaHalfAccelFdrAus)))
``` is carried out. If, in step 405, the system determines that the 'acceleration' driving situation is present, after step 405 step 406 is carried out. In this step, the value B is assigned to value BEW. After step 406, step 408 is carried out. However, if, in step 405, the system determines that the 'acceleration' driving situation is not present, which is equivalent of saying that neither the 'deceleration' driving situation nor the 'acceleration' driving situation but rather an "other driving situation" is present, after step 405 step 407, in which the value S is assigned to value BEW, is carried out. After step 407, step 408 is carried out.

The procedure for determining the driving situation carried out in steps in steps 403 and 405 is carried out via a discrete logic system. Values P_aRadmVerz, P_axVerz, P_aRadmAccel, P_MKaHalfAccel, P_axAccel, and P_MKaHalfAccelFdrAus that are used are parameters that are to be applied. Basically, in steps 403 and 405 the wheel speeds, the time derivatives of the wheel speeds, a longitudinal acceleration value, and value ASR, which indicates whether, in accordance with a drive slip control system, interventions are being carried out, are used. The driving situation may also be determined using the fuzzy method.

Below, we describe FIG. 5 (FIGS. 5a to 5h). In these Figures, various membership functions (fuzzy sets) used in the wheel stability analysis are shown. Basically, there are three different categories of membership function. The first category contains the two fuzzy sets "small" and "great", which are parameterized in a fixed manner. In the case of these two fuzzy sets, values Kx1 and Kx2, and thus also the transition between the ordinate values 0 and 1, are predefined and fixed. The second category of fuzzy sets contains the fuzzy sets "smaller than", "greater than", and "close to". These fuzzy sets are parameterized fuzzy sets that are influenced by state values that change over time. This is described below with reference to the "smaller than" fuzzy set. For example, if a check is performed to determine whether "wheel speed variable vij is smaller than speed vref", in this instance state value vref constitutes the reference for the fuzzy set, i.e. the value of speed variable vref defines the value 'reference' on the abscissa. The position of the two break points is then determined by the difference values Kx1 and Kx2, which are predefined and fixed. The procedure is similar for the other two fuzzy sets. The third category of fuzzy sets contains the fuzzy sets "smallest", "greatest" and "closest to". These fuzzy sets are adaptive fuzzy sets that are parameterized solely by the relative position of the individual wheel-specific state values and are therefore dynamic. In these three instances all of the vehicle's wheels should be taken into account when determining the assignment function, as a function of the linguistic values. Described below is how a fuzzy set is generated using the example of the "smallest" fuzzy set. If, for example, a check is to be performed to determine whether wheel speed variable vij is smallest, first the two values MAX(x) and MIN(x) are determined. MAX(x) constitutes the maximum value and MIN(x) the minimum value among all the wheel speed variables. Starting from these two values, weighted difference Kx1* (MAX(x)−MIN(x)) is calculated. This procedure constitutes scaling, as the fuzzy set only has the abscissa range that is predefined by the input variable for which calculations are to be performed. Relative input variables are then used as the input variables for this fuzzy set.

The following should be deemed to apply to the equations and relationships set forth in this application: The equations and relationships indicate given concrete specifications for calculations, in accordance with which a value is determined from various input variables. Nevertheless, it should be deemed that the application also includes the general relationship for each of these equations and relationships, i.e. the general relationship between the input variables and the value to be determined, as distinct from the concrete specifications for calculations.

What is claimed is:

1. A method for determining a speed variable representing a speed of a vehicle having wheels, comprising:

determining wheel speed variables, each of the wheel speed variables describing a speed of a corresponding one of the wheels;

determining a respective weighting variable for each of the wheel speed variables;

determining a support variable as a function of weighted averaging of the wheel speed variables, each of the wheel speed variables being weighted by the respective weighting variable; and determining the speed variable as a function of the support variable.

2. The method of claim 1, wherein:

each of the weighting variables is determined as a function of a predefined set of rules, the predefined set of rules being selectable from a plurality of predefined sets of rules as a function of a vehicle movement variable, the vehicle movement variable indicating at least a movement of the vehicle in a longitudinal direction; and the vehicle movement variable is determined at talk least as a function of:

the wheel speed variables;

time derivatives of the wheel speed variables;
a function of a value corresponding to a longitudinal acceleration of the vehicle; and
a value indicating that a drive slip control system has performed at least one intervention procedure.

3. The method of claim 2, wherein the vehicle movement variable is useable for distinguishing among a plurality of vehicle movement types, the plurality of vehicle movement types including at least one of:
a decelerating vehicle movement, for which a first set of rules is selectable;
an accelerating vehicle movement, for which a second set of rules is selected; and
another vehicle movement that is neither decelerating nor accelerating, for which a third set of rules is selectable.

4. The method of claim 1, wherein the step of determining the respective weighting variable includes:
accounting for at least one modification phase that is present for wheels; and
determining time variables representing a duration of adjustment phases, the time variable being for determining the weighting variables.

5. The method of claim 1, further comprising:
determining a respective wheel variable for each of the wheels, each of the respective wheel variables representing a second time derivative of the speed of the corresponding one of the wheels;
wherein each respective weighting variable includes at least one of:
a stability variable determined at least as a function of the respective wheel variable and representing a measure of a wheel stability;
a situation variable including at least one of a status of the respective wheel speed variable relative to the speed variable and a value indicating a number of the wheels satisfying a predefined condition; and
a quality variable representing a measure of a quality of the respective weighting variable determined in a previous time increment.

6. The method of claim 1, wherein the speed variable includes a first component determined as a function of a value corresponding to a vehicle acceleration and a second component determined as a function of the support variable, the value corresponding to the vehicle acceleration including a longitudinal acceleration component determinable by a model and including an error component determined as a function of the support variable.

7. A method for determining a speed variable representing a speed of a vehicle having wheels, comprising:
determining wheel speed variables, each of the wheel speed variables describing a speed of a corresponding one of the wheels;
determining a respective weighting variable for each of the wheel speed variables;
determining a support variable as a function of weighted averaging of the wheel speed variables, each of the wheel speed variables being weighted by the respective weighting variable; and
determining the speed variable as a function of the support variable; wherein:
each respective weighting variable is determined using at least one of a non-crisp logic system and a fuzzy logic system;
the at least one weighting variable represents at least one probability value; and the at least one probability value indicates a suitability of the wheel for determining the at least one speed variable.

8. The method of claim 7, wherein:
the at least one of the non-crisp logic system and the fuzzy logic system is based on a plurality of membership functions, the plurality of membership functions forming at least one rule for performing at least one calculation for at least one input variable;
at least one of the plurality of membership functions has a fixed, predefined characteristic; and
at least one other of the plurality of membership functions has a variable characteristic; and
the plurality of membership functions are for at least one category, the at least one category including at least one of "small", "great", "smaller than", "greater than", "close to", "smallest", "greatest", and "closest to".

9. The method of claim 8, wherein each of the plurality of membership functions having a variable characteristic adapts to at least one of the at least one input variable and a reference variable, the reference variable being useable as a comparison value in the at least one calculation for the at least one input variable, the reference variable forming a basis for the at least one rule.

10. A method for determining a speed variable representing a speed of a vehicle having wheels, comprising:
determining wheel speed variables, each of the wheel speed variables describing a speed of a corresponding one of the wheels;
determining a respective weighting variable for each of the wheel speed variables;
determining a support variable as a function of weighted averaging of the wheel speed variables, each of the wheel speed variables being weighted by the respective weighting variable; and
determining the speed variable as a function of the support variable;
wherein each respective weighting variable is determined as a function of at least one of:
the wheel speed variables;
first wheel variables representing first time derivatives of the wheel speed variables;
second wheel variables representing second time derivatives of the wheel speed variables; and
at least one wheel braking force variable corresponding to a prevailing braking force between a tire and a road.

11. A method for determining a speed variable representing a speed of a vehicle having wheels, comprising:
determining wheel speed variables, each of the wheel speed variables describing a speed of a corresponding one of the wheels;
determining a respective weighting variable for each of the wheel speed variables;
determining a support variable as a fuinction of weighted averaging of the wheel speed variables, each of the wheel speed variables being weighted by the respective weighting variable;
determining the speed, variable as a function of the support variable;
determining, using each of the wheel speed variables, a respective slip-corrected wheel speed variable accounting for a slip present at the corresponding one of the wheels;
determining from the slip-corrected wheel speed variables transformed wheel speed variables, the transformed wheel speed variables accounting for a vehicle movement, the vehicle movement including the vehicle movement described by a yaw rate and a steering angle; and determining from the transformed wheel speed variables extrapolated wheel speed variables, for which an acceleration of the vehicle is accounted for;

wherein these further steps are performed prior to the step of determining the respective weighting variable.

12. A method for determining a speed variable representing a speed of a vehicle having wheels, comprising:

determining wheel speed variables, each of the wheel speed variables describing a speed of a corresponding one of the wheels;

determining a respective weighting variable for each of the wheel speed variables;

determining a support variable as a function-of weighted averaging of the wheel speed variables, each of the wheel speed variables being weighted by the respective weighting variable;

determining the speed variable as a function of the support variable; and at least one of suppressing and filtering small values among the weighting variables, before further processing the weighting variables.

13. A method for determining a speed variable representing a speed of a vehicle having wheels, comprising:

determining wheel speed variables, each of the wheel speed variables describing a speed of a corresponding one of the wheels;

determining a respective weighting variable for each of the wheel speed variables;

determining a support variable as a function of weighted averaging of the wheel speed variables, each of the wheel speed variables being weighted by the respective weighting variable;

determining the speed variable as a function of the support variable;

determining an evaluation variable as a function of the weighting variables, the evaluation variable being a measure of a suitability of the support variable for determining the speed variable;

determining a magnitude of a support to be performed as a function of the evaluation variable; and calculating, as a function of the evaluation variable, a factor for determining a component of the speed variable associated with the support variable.

14. The method of claim 13, further comprising:

calculating, as a function of the evaluation variable, an uncertainty term value, wherein the uncertainty term value corresponds to a quality of the speed variable and determines the weighting variables.

15. A method for determining a speed variable representing a speed of a vehicle having wheels, comprising:

determining wheel speed variables, each of the wheel speed variables describing a speed of a corresponding one of the wheels;

determining a respective weighting variable for each of the wheel speed variables;

determining a support variable as a function of weighted averaging of the wheel speed variables, each of the wheel speed variables being weighted by the respective weighting variable; and determining the speed variable as a function of the support variable;

wherein each of the-weighting variables is determined as a function of a predefined set of rules, the predefined set of rules being selectable from a plurality of predefined sets of rules as a function of a vehicle movement variable, the vehicle movement variable indicating at least a movement of the vehicle in a longitudinal direction;

wherein the vehicle movement variable is determined at least as a function of:

the wheel speed variables;

time derivatives of the wheel speed variables;

a function of a value corresponding to a longitudinal acceleration of the vehicle; and a value indicating that a drive slip control system has performed at least one intervention procedure;

wherein the vehicle movement variable is useable for distinguishing among a plurality of vehicle movement types, the plurality of vehicle movement types including at least one of:

a decelerating vehicle movement, for which a first set of rules is selectable;

an accelerating vehicle movement, for which a second set of rules is selected; and another vehicle movement that is neither decelerating nor accelerating, for which a third set of rules is selectable; and wherein:

| | | |
|---|---|---|
| FRadij = | | (FRadij from straightforward stability analysis (FRStij)) |
| | or | (FRadij from situation analysis (FRSiij)) |
| | or | (FRadij from time-related uncertainty term FRZij)) |
| FRStij = | | (absolute value of vijpp small) |
| | and | (   (absolute value of vijpp smallest) |
| | | or   (difference between vijppmin and vijppmax small)) |
| | and | (absolute value of vijp small) |
| | and | (   (vijp close to axModell + axOff    (not in the case of FMotr)) |
| | | or   (absolute value of axOff great (not in the case of FMotr))) |
| | and | (   (   vij ''' close to vRef') |
| | | and   (   (vij ''' closest to vRef') |
| | | or   (difference between vijmin and vijmax small)))  |
| | or | (   (vij ''' smaller than vRef'   (vij ''' > 2*vijMin)) |
| | and | (Fbij small)                             (vij ''' > 2*vijMin)))) |
| FRSiij = | | (vij ''' close to vRef') |
| | and | (vij ''' smaller than vRef') |
| | and | (number of wheels having (vij ''' smaller than vRef') great) |
| FRZij = | | (uncertainty term great) |
| | and | (   (   (vij ''' smaller than vRef') |
| | | and   (Fbij small)) |

-continued

|  |  | or | ( | ($vij'''$ close to vRef') |
|---|---|---|---|---|
|  |  |  | and | (absolute value of vijp small))) | is the first set of rules;

| Fradij = |  | ( | (FRadij from straightforward stability analysis (FRStij)) |
|---|---|---|---|
|  |  | and | (FRadij from situation analysis (FRSiij))) |
|  | or | (FRadij from under-braking analysis (FRUbFij)) |  |
|  | or | (FRadij from time-related uncertainty term (FRZij)) |  |
| FRStij = |  | (absolute value of vijpp small) |  |
|  | and | ( | (absolute value of vijpp smallest) |
|  |  | or | (difference between vijppmin and vijppmax small)) |
|  | and | (absolute value of vijp small) |  |
|  | and | (vijp close to axModell + axOff(not in the case of [FMotr and (ABS])) |  |
|  | and | ( | ($vij'''$ greatest) |
|  |  | or | (difference between vijmin and vijmax small)) |
| FRSiij = |  | ( | ($vij'''$ smaller vRef') |
|  | and | (vijpp small) |  |
|  | and | ( | ($vij'''$ greatest) |
|  |  | or | (difference between vijmin and vijmax small) |
|  | and | (absolute value of vijpp small | ($vij''' > 2*vjMin$)) |
|  | and | (number of wheels having [amount vijpp very small] great) |  |
|  |  |  | ($vij''' > 2*vjMin$))) |
|  | or | ( | ($vij'''$ greater than vRef') |
|  |  | and | (Fbij great) |
|  |  | and | (vijp great) |
|  |  |  | and ( ($vij'''$ close to vRef') |
|  |  |  | or (difference between vijmin and vijmax small))) |
|  | or | (tadjustmentij) great | (wheel in adjustment phase) |
|  |  | and | (vijp small) |
|  |  | and | ( ($vij'''$ greatest) |
|  |  |  | or (difference between vijmin and vijmax small))) |
|  | or | ( | ($vij'''$ close to vRef') |
|  |  | and | (vijp great) |
|  |  | and | (number of ABS-controlled wheels small)) |
| FRUbFij = |  | (absolute value of vijp small) |  |
|  | and | (difference between vijmin and vijmax small) |  |
|  | and | (difference between vijpmin and vijpmax small) |  |
|  | and | (difference between vijppmin and vijppmax small) |  |
|  | and | ($vij'''$ smaller than vRef' | ($vij''' > 2*vijMin$)) |
| FRZij = |  | (uncertainty term great) |  |
|  | and | ($vij'''$ smaller than vRef') |  |
|  | and | ($vij'''$ greatest) |  |
|  |  | or | (difference between vijmax and vijmin small) | is the second set of rules; and

| Fradij = |  | (FRadij from straightforward stability analysis (FRStij)) |
|---|---|---|
|  | or | (FRadij from situation analysis (FRSiij, only in the case of FMotr)) |
|  | or | (FRadij from time-related uncertainty term FRZij)) |
| FRStij = |  | (absolute value of vijpp small) |
|  | and | ( (absolute value of vijpp smallest) |
|  |  | or (difference between vijppmin and vijppmax small)) |
|  | and | (absolute value of vijp small) |
|  | and | ( (vijp close to axModell + axOff (not in the case of FMotr) |
|  | and | ( ( $vij'''$ close to vRef') |
|  |  | and ( ($vij'''$ closest to vRef') |
|  |  | or (difference between vijmin and vijmax small))) |
|  |  | or ( ($vij'''$ smaller than vRef') |
|  |  | and (difference between vijmin and vijmax small))) |
| FRSiij = |  | ($vij'''$ close to vRef') |
|  | and | ($vij'''$ smaller than vRef') |
|  | and | (number of wheels having ($vij'''$ smaller than vRef') great) |
| FRZij = | Zero |  | is the third set of rules.

16. A method for determining a speed variable representing a speed of a vehicle having wheels, comprising:
determining wheel speed variables, each of the wheel speed variables describing a speed of a corresponding one of the wheels;
determining a respective weighting variable for each of the wheel speed variables;
determining a support variable as a function of weighted averaging of the wheel speed variables, each of the wheel speed variables being weighted by the respective weighting variable;
determining the speed variable as a function of the support variable; and
using at least one of a deceleration driving query set and an acceleration driving query set, wherein:

|  | (not ASR) |  |
|---|---|---|
| and | ( | ( (mean $vij'''$ < vRef' ) |
|  |  | and (mean vijp < p_aRadmVerz) |
|  | or | (axModell < P_axVerz) |
|  | or | (number of wheels in ABS > 2) | is the deceleration driving query set, the deceleration driving query set determining whether a deceleration driving situation is present; and

```
        (not deceleration)
and     (     (       (mean vij ' ' ' > vRef')
        and   (mean vijp > P_aRadmAccel))
        or    (       (MMot*ueGe > P__MkaHalfAccel)
              or      (   ASR
                      and (axModell > P_axAccel)))
        and   (axModell + axOff > P_axAccel))
or      (     FdrAus
        and   (MMot*ueGe > P__MkaHalfAccelFdrAus)))
``` is the acceleration driving query set, the acceleration driving query set determining whether an acceleration driving situation is present.

17. A device for determining a speed variable representing a speed of a vehicle having wheels, the device comprising:

means for determining wheel speed variables, each of the wheel speed variables describing a speed of a corresponding on of the wheels;

means for determining a respective weighting variable for each of the wheel speed variables;

means for determining a support variable as a function of weighted averaging of the wheel speed variables, each of the wheel speed variables being weighted using the respective weighting variable; and means for determining the speed variable as a function of the support variable.

18. A device for determining a speed variable representing a speed of a vehicle having wheels, the device comprising:

a first arrangement for determining wheel speed variables, each of the wheel speed variables describing a speed of a corresponding one of the wheels;

a second arrangement for determining a respective weighting variable for each of the wheel speed variables;

a third arrangement for determining a support variable as a function of weighted averaging of the wheel speed variables, each of the wheel speed variables being weighted using the respective weighting variable; and a fourth arrangement for determining the speed variable as a function of the support variable.

* * * * *

UNITED STATES PATENT AND TRADEMARK OFFICE
CERTIFICATE OF CORRECTION

PATENT NO. : 6,611,781 B1
DATED : August 26, 2003
INVENTOR(S) : Ralf Gutmann

It is certified that error appears in the above-identified patent and that said Letters Patent is hereby corrected as shown below:

Column 18,
Line 56, change "fuinction" to -- function --

Signed and Sealed this

Eighteenth Day of January, 2005

JON W. DUDAS
*Director of the United States Patent and Trademark Office*